United States Patent
Alles

(10) Patent No.: US 6,786,473 B1
(45) Date of Patent: Sep. 7, 2004

(54) STRING TO TUBE OR CABLE CONNECTOR FOR PULLING TUBES OR CABLES THROUGH DUCTS

(75) Inventor: Harold Gene Alles, Lake Oswego, OR (US)

(73) Assignee: Home Comfort Zones, Inc., Beaverton, OR (US)

( * ) Notice: Subject to any disclaimer, the term of this patent is extended or adjusted under 35 U.S.C. 154(b) by 0 days.

(21) Appl. No.: 10/249,196

(22) Filed: Mar. 21, 2003

(51) Int. Cl.$^7$ ................................................ E21C 29/16
(52) U.S. Cl. .............................................. 254/134.3 FT
(58) Field of Search ..................... 254/134.4, 134.3 FT, 254/134.3 R, 134.3 PA, 388–417

(56) References Cited

U.S. PATENT DOCUMENTS

| | | | | |
|---|---|---|---|---|
| 4,411,409 A | * | 10/1983 | Smith | 254/134.3 FT |
| 4,460,159 A | * | 7/1984 | Charlebois et al. | 254/134.3 R |
| 4,552,338 A | * | 11/1985 | Lindgren | 254/134.3 FT |
| 4,684,211 A | * | 8/1987 | Weber et al. | 385/136 |
| 4,895,221 A | * | 1/1990 | Carlson | 184/15.1 |

* cited by examiner

Primary Examiner—Robert C. Watson

(57) ABSTRACT

A connector for connecting a pull string to a tube or cable for pulling the tube or cable through a duct. When an obstructing edge stops progress, the connector converts additional pull string tension into a rotation force that enables the connector header to pivot on the obstructing edge until it slips and passes by the obstructing edge.

18 Claims, 4 Drawing Sheets

STRING TO TUBE OR CABLE CONNECTOR FOR PULLING TUBES OR CABLES THROUGH DUCTS

BACKGROUND OF INVENTION

In zone climate control systems for residential forced air HVAC systems, airflow control valves are installed in air ducts. The airflow control valves can be pneumatically operated through small air tubes or powered and controlled by electrical signals through wires in a cable. When zone systems are installed in existing systems, it is often difficult to find a path for the air tubes or cable from an airflow control valve to the central controller because the ducts are behind walls and ceilings or in the attic or crawlspace.

For retrofit installations, the inside of the existing ducts can provide a path for the tube or cable. The tube or cable needs to be pulled from the airflow control valve through the air duct to a central location such as the discharge plenum of the HVAC blower. This is accomplished by connecting a strong installation blower to the duct system at the central blower plenum and blocking all airflow paths except one so the only airflow path is through the one unblocked air duct to the installation blower. The blower is connected so that air flows from the air duct toward the blower. A parachute about twice the diameter of the air duct is connected to a strong and flexible string and placed in the airflow. The airflow inflates the parachute and quickly pulls the parachute and string through the duct path to the installation blower. The string is then used to pull the tube or cable from the air vent to the central plenum.

The airflow control valves can be installed at the air vents where the air ducts terminate in a room. FIG. 1 illustrates three typical paths from air vents 102, 103, 104 through air ducts to the blower plenum 100. Air ducts 101 can have a round or rectangular cross section and all cross section dimensions are greater than 3". Duct paths can be over 100 feet long and have several sharp bends such as 114 and 113 where the ducts transition from horizontal to vertical and/or connect to main trunks.

The tubes or cables 110, 111, 112 are typically no more than ¼" in diameter and sufficiently flexible and strong to be pulled through the duct path using the pull string. However, air ducts are often poorly installed and have sharp edges where ducts make turns and connect to trunks.

FIG. 2A illustrates the problem caused by the sharp edge 204 formed by duct 202 making an off-center connection with trunk 203. The pull string 201 has a small diameter and is very flexible, so when pull string 201 pulls tube or cable 200, the pull string makes tight contact with the edge 204. Referring to FIG. 2B, when tube or cable 200 reaches position 211, the tube or cable is obstructed by the edge. Applying additional tension on the pull string can not generate a force that can lift the tube or cable over the edge. Using a rigid device or flexible material to transition from the pull string to the tube or cable does not prevent obstruction because the obstructing edge is sharp. The edge deforms the pull string as the pull string is pulled over the edge. The obstructing edge catches any discontinuity in diameter or change in flexibility.

Using residential HVAC air duct as conduits for tubes or cables is unusual and there is little prior art to teach solutions to passing an obstructing edge. The electrical and communication industry has the most applicable prior art, but the ducts and conduits are designed for cables to be pulled, so obstructing edges are uncommon. Access ports at bends and corners are often provided to limit the length of the pull. Therefore the prior art for cable pulling does not teach how to pass by an obstructing edge. For example, U.S. Pat. No. 5,654,526 issued Aug. 5, 1997 to Sharp describes connectors for conduit sections that provide access for lubrication to reduce the friction when pulling. Patent U.S. Pat. No. 5,029,817 issued Jul. 9, 1991 to Tamm describes a device that includes a roller for installation at a bend in the conduit so the cable can pass by the corner when pulled, but this does not provide a method to pass an obstruction edge. U.S. Pat. No. 5,310,294 issued May 10, 1994 to Perkins describes a connector for connecting a boring devise to a cable for pulling the cable through the hole made by the boring device, but this connector is not adaptable to connecting a pull string to a cable. U.S. Pat. No. 4,078,767 issued Mar. 14, 1978 issued to Battaglia describes a connector for connecting a multi-wire cable to a pull wire. The connector provides a strong, quick, and non-damaging connection, but does not provide a way of passing by an obstructing edge. U.S. Pat. No. 4,552,338 issued Nov. 12, 1985 to Lindgren describes a devise for pushing or pulling a cable through a conduit comprised of many beads with axial holes and helical springs and a connector that connects sections of beads together. This devise is not adaptable for use in a HVAC air duct and provides no method for passing by an obstruction.

SUMMARY OF THE INVENTION

The invention is a connector to connect a pull string to a tube or cable. The connector converts the tension force in the pull string to a rotation force about a pivot point between the connector and an obstructing edge so that increasing the tension on the pull string causes rotation about the pivot point until the pivot point becomes unstable and the connector slips by the obstructing edge so that a tube or cable can be pulled by the obstructing edge.

DETAILED DESCRIPTION

Figure 1:
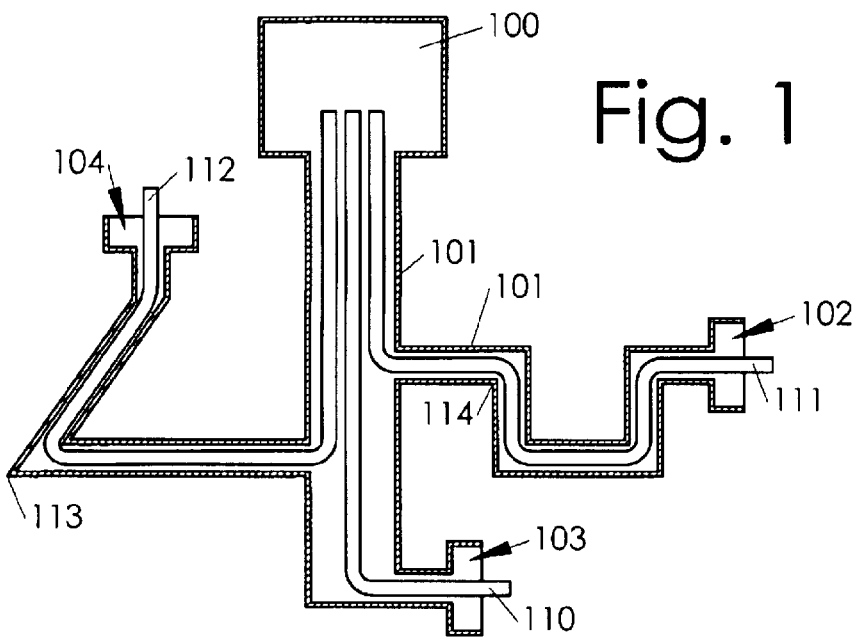
FIG. 1 is a diagram of typical air duct paths in a residential forced air HVAC system.
Figure 2A:
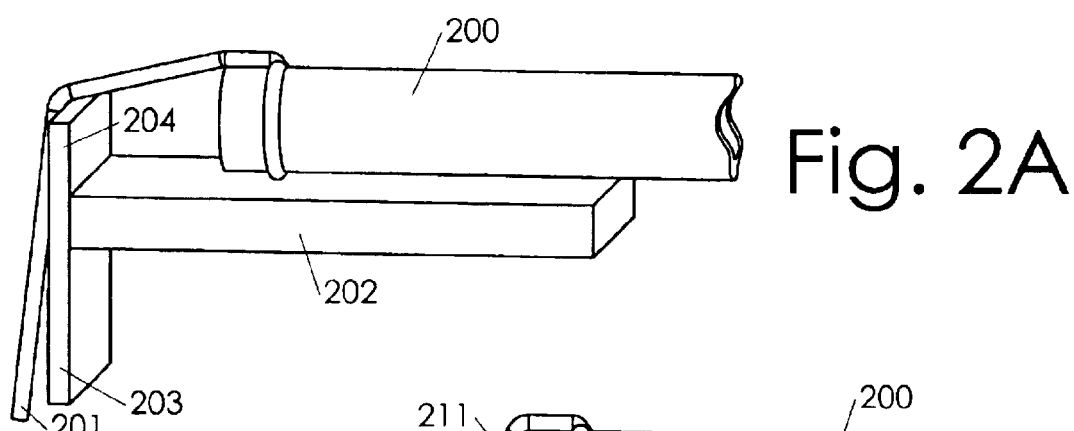
FIG. 2 is a diagram showing how a sharp edge obstructs pulling a tube.
Figure 2B:
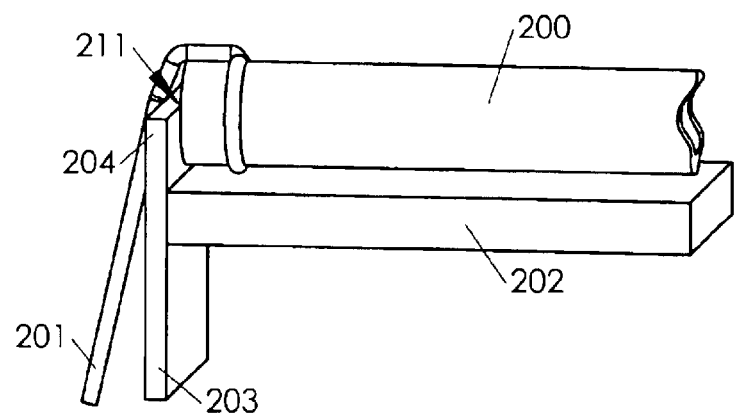
Figure 3A:
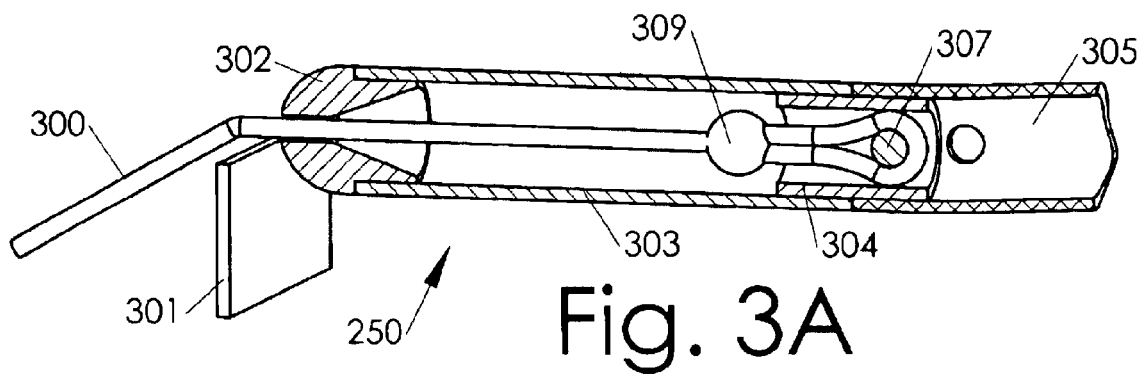
FIG. 3 is a cross section drawing of the invention.

FIG. 3A is a cross section drawing of the connector. The pull string 300 passes through an axial hole in the header 302. The pull string is typically a high quality fishing line 0.015" to 0.030" in diameter with a tensile strength of at least 100 lbs. The header 302 is cylindrically symmetric, approximately 0.25" in diameter to match the diameter of the tube 305. The header presents a spherical surface in the direction of pulling. The header is made of a rigid and hard material such a steel, and is polished smooth so there are no sharp edges that might abrade the pull string and so it is easy to thread the pull string through the hole.

A compressible elastic cylinder 303 connects to the header 302. The compressible cylinder 303 is approximately 0.25" in diameter to match the diameter of the tube 305 and approximately 1"-2" long. The cylinder material and length is selected so that the cylinder is axially unstable as it is compressed. As the cylinder is compressed, the cylinder axis deforms into a "c" or "s" shape while the cross section remains substantially circular. Surgical tubing made of silicon rubber is an example of suitable material.

A joiner 304 mates the compressible cylinder 303 to the tube 305. The joiner is a plastic or metal tube approximately ½" to ¾" long and selected to press fit to the inside of the compressible cylinder and the inside of the tube.

To make the connection between the pull string and tube, the pull string 300 is threaded through the header 302 and compressible cylinder 303 and joiner 304. A loop 306 is tied at the end of the pull string and the loop is inserted into the tube 305. A pin or nail 307 with a sharp point is pushed through a side of tube 305 approximately ½" from the end of the tube so that the pin passes through the loop 306 in the pull string and the pin then passes through the opposite side of the tube. FIG. 3C is a cross section end view showing the pin passing through the loop in the pull string the pin is perpendicular to the axis of the tube and passes through the axis of the tube. The pin end 308 is cut off so that the pin end is flush with the outside of the tube. The pin is held in place by friction between the pin and the sides of the tube. The tube is pushed onto the joiner and the pull string is pulled while holding the header. This completes the connection.

Figure 3B:
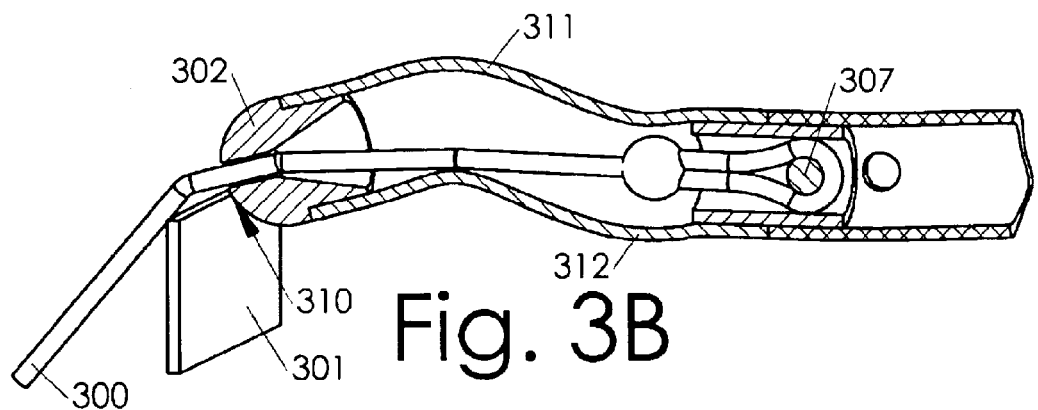
Figure 3C:
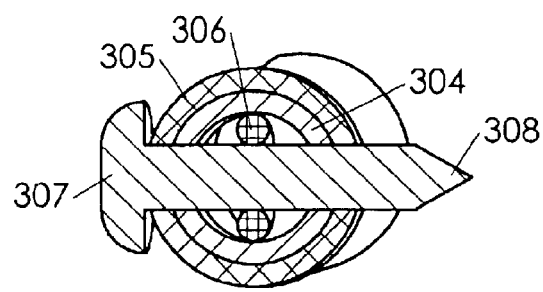
Figure 4A:
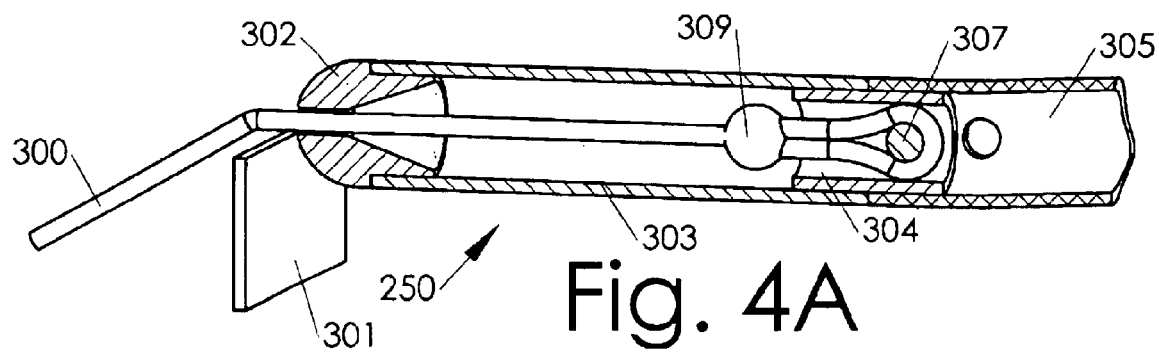
FIG. 4 is a diagram showing how the invention enables a tube to pass an obstruction.
Figure 4B:
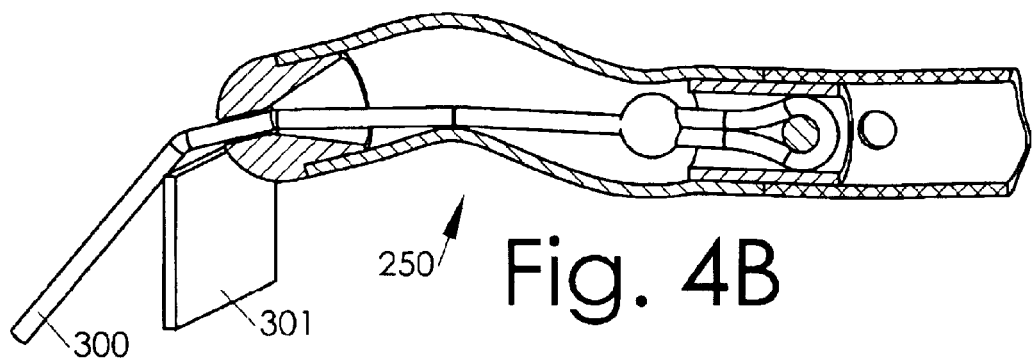
Figure 4C:
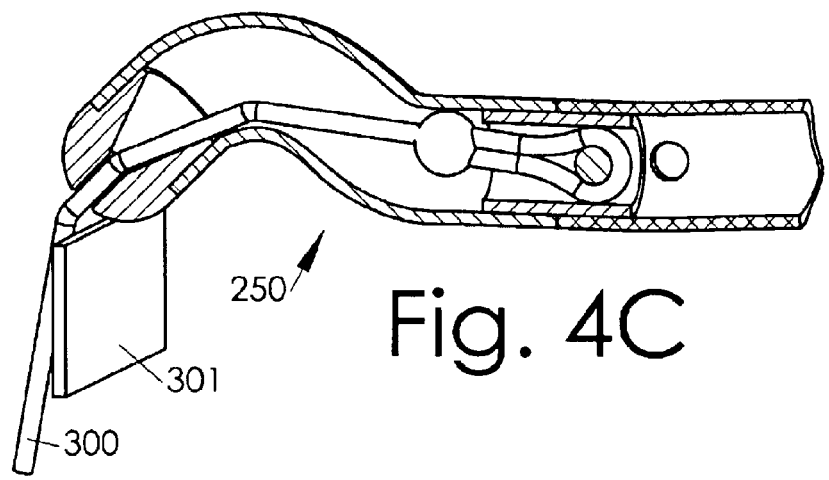
Figure 4D:
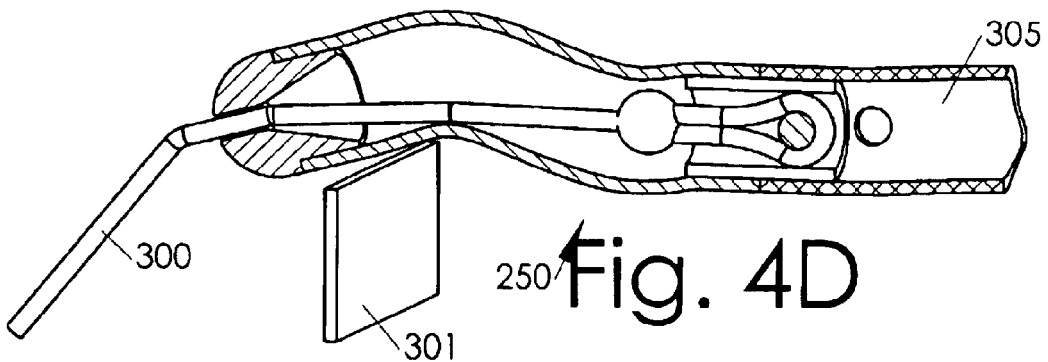

FIG. 3B is a cross section diagram of the connector and completed connection with the pull string 300 under tension and the header 302 obstructed by an edge 301. The pull string passes freely through the hole in the header so the tension is transferred to the tube by the pin 307. As pull string tension is increased, the compressible cylinder deforms and the walls take a "c" or "s" shape as illustrated by 311 and 312. The contact point 310 between the header and the obstructing edge is a pivot point. Since the pivot point is below the axis where the tension is applied, the compressible cylinder will preferentially deform upward. The upward deformation of the compressible cylinder causes the header to rotate about the pivot point. An increase in tension in pull string 313 causes an increase in deformation and additional rotation.

FIG. 4 illustrates the behavior of the connector 400 as the tube 404 is pulled by pull string 401 to the obstructing edge 403. Referring to FIG. 4A, a the tube is pulled, the header 402 is obstructed. Referring to FIG. 4B, a tension in pull string 411 increases, the connector 410 begins to deform. Additional tension 421 causes more deformation and more rotation of the header of the connector 420. Referring to FIG. 4C, a the header rotates and tension increases, the pivot point between the obstruction edge and the spherical surface of the header becomes unstable and slips. Referring to FIG. 4D, te header passes the obstructing edge and the connector 430 returns to a substantially cylindrical shape and the pull string 431 can pull the tube 432 past the obstructing edge 433.

Figure 5A:
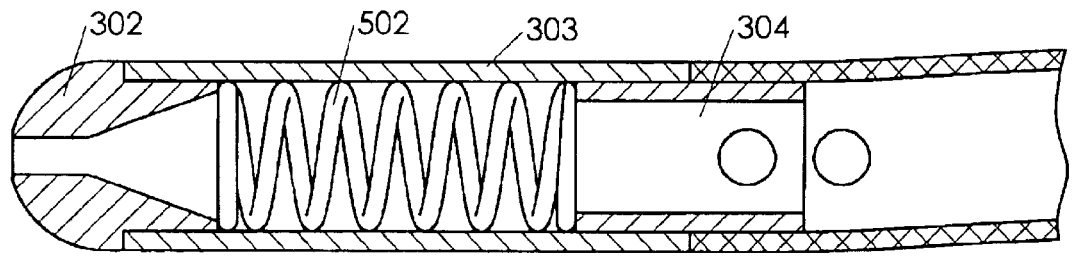
FIG. 5 is a diagram showing two alternative embodiments of the invention.

FIG. 5A illustrates using a coil spring 502 as part of the compressible cylinder 500. One end of the spring presses against the header 502 and the other end presses against the Joiner 501. The spring can provide a wider range of compression and instability characteristics than possible with rubber or plastic alone.

Figure 5B:
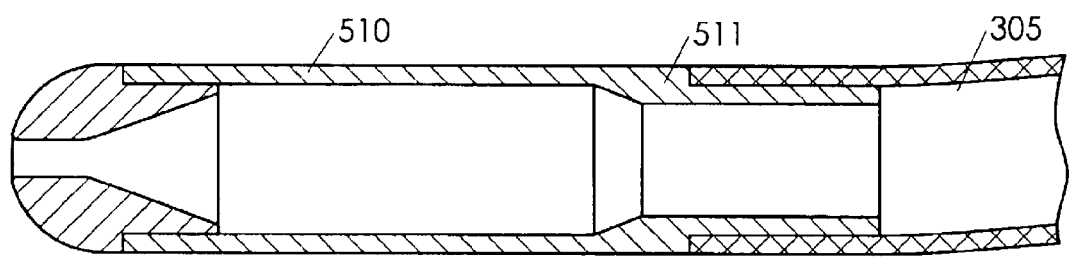

FIG. 5B illustrates an alternate embodiment where the compressible cylinder 510 has an integrated joiner 511 that mates with the tube 512. This shape is practical if the compression cylinder is made by injection molding or by chemically joining together two separate plastic or rubber cylinders of the appropriate size.

Figure 6A:
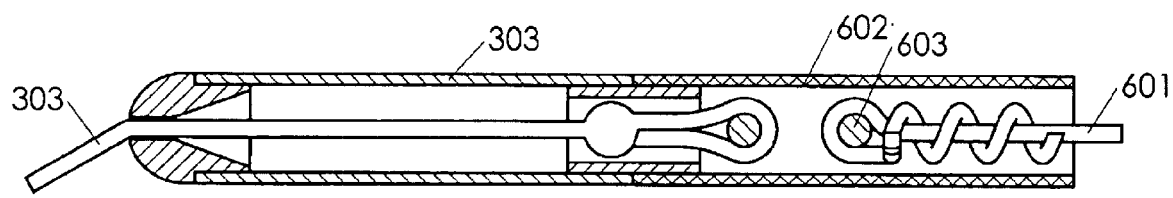
FIG. 6 is a diagram showing the invention adapted for pulling a cable.

FIG. 6A illustrates the connector 600 adapted for pulling a thin cable 602. A short section of tube 601 approximately 2"–4" long is connected to the pull string as described above. The cable is fastened to the tube in a similar way the pull string is fastened to the tube. A loop is made in the end of the cable by twisting or other known process. A pin 603 is pushed through the side of tube 601, through the loop in the cable, and into the opposite side of the tube.

Figure 6B:
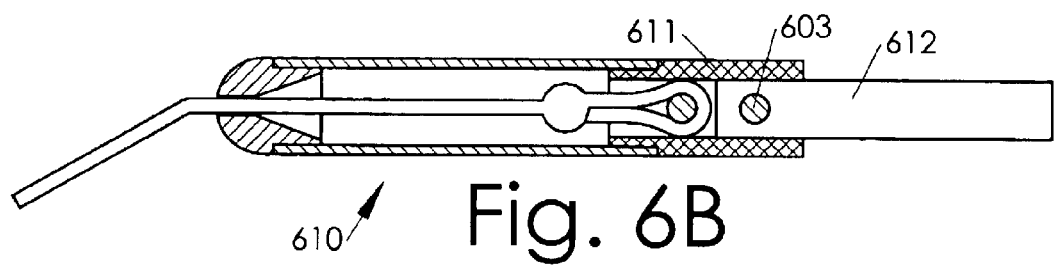

FIG. 6B illustrates an alternate embodiment of the connector 610 where the joiner is adapted to receive the cable 612. A thicker, multi-wire cable is illustrated where the cable sheath has sufficient strength so that the loop in the cable can be omitted. Pin 613 is pushed through the cable and cut flush with the other side of the joiner.

The forgoing describes illustrative examples of how to construct and use the invention, and should not be interpreted to limit or restrict the generality of the invention. Other methods of converting pull string tension into a rotational force can be devised by those with ordinary skills in the art of mechanical design.

From the description and the figures described above, the function and benefit of the connector can be understood and practiced by those ordinarily skill in the art of pulling tubes and cables through ducts.

I claim:

1. A connector for connecting a pull string to a tube for pulling the tube through a duct, the connector comprising:
   1) a first means for connecting the pull string to the tube; and
   2) a second means for converting a tension force applied to the pull string into a rotational force about a pivot point between the connector and an obstructing edge, the connector rotating about the pivot point as the tension force is increased, the second means for converting further comprising,
      a) a header with an axial hole for the pull string to pass through, the header made of a solid material;
      b) an elastic cylinder connected to the header, the elastic cylinder axially unstable under compression; and
      c) a joiner that connects the cylinder to the tube; whereby the tension force is converted to the rotational force; and whereby the header becomes unstable at the pivot point and slips past the obstructing edge, enabling the connector to pass by the obstructing edge.

2. The connector of claim 1 wherein the elastic cylinder comprises one of plastic, rubber, and braided metal wire.

3. The connector of claim 1 wherein the elastic cylinder further includes a spring.

4. A connector for connecting a pull string to a tube for pulling the tube through a duct, the connector comprising:
   1) a first means for connecting the pull string to the tube; and
   2) a second means for converting a tension force applied to the pull string into a rotational force about a pivot point between the connector and an obstructing edge, the connector rotating about the pivot point as the tension force is increased, the second means for converting further comprising,
      a) a header with an axial hole for the pull string to pass through, the header made of a solid material; and
      b) an elastic cylinder connected to the header, the elastic cylinder axially unstable under compression, and the elastic cylinder connects to said tube; whereby the tension force is converted to the rotational force; and whereby the header becomes unstable at the pivot point and slips past the obstructing edge, enabling the connector to pass by the obstructing edge.

5. A connector for connecting a pull string to a cable for pulling the cable through a duct, the connector comprising:
1) a first means for connecting the pull string to the cable; and
2) a second means for converting a tension force applied to the pull string into a rotational force about a pivot point between the connector and an obstructing edge, the connector rotating about the pivot point as the tension force is increased, the second means for converting comprising,
   a) a header with an axial hole for the pull string to pass through, the header made of a solid material,
   b) an elastic cylinder connected to the header, the elastic cylinder axially unstable under compression, and
   c) a joiner that connects the cylinder to the cable; whereby the tension force is converted to the rotational force; and whereby the header becomes unstable at the pivot point and slips past the obstructing edge, enabling the connector to pass by the obstructing edge.

6. The connector of claim 5 wherein the elastic cylinder comprises one of plastic, rubber, and braided metal wire.

7. A method for using a pull string to pull a tube or cable through a duct past an obstructing edge, the method comprising:
1) connecting the pull string to a compressible, elastic cylinder of a connector,
2) connecting the compressible, elastic cylinder to the tube or cable;
3) pulling the pull string to pull the tube or cable through the duct, until a rigid, hard header of the connector encounters the obstructing edge at a pivot point;
4) providing a tension force on the pull string;
5) converting the tension force to a rotational force such that the header rotates about the pivot point;
6) the compressible, elastic cylinder deforming in response to the tension force; and
7) increasing the tension force such that the rotation about the pivot point is sufficient to cause the header to slip past the obstructing edge at the pivot point, enabling the connector to pass the obstructing edge;
whereby the tube or cable is pulled through the duct past the obstructing edge.

8. A connector for coupling a pull string to a tube or cable, whereby the tube or cable can be pulled through a duct having an obstructing edge, the connector comprising:
an elongated body which is flexible and unstable under compression, the elongated body including an axial bore through which the pull string may be passed;
a solid header having a substantially axial hole through which the pull string may be passed, the solid header being coupled to a first end of the elongated body and having the axial hole in connection with the axial bore, wherein an end of the solid header which is not adjacent the elongated body has a substantially rounded surface;
a joiner coupled to a second end of the elongated body and couplable to the tube or cable;
means for coupling the pull string to the connector at least as far away from the solid header as is the joiner, whereby tension on the pull string is applied to the connector behind the flexible, elongated body, compressing the elongated body and causing the elongated body to become unstable and curve, enabling the solid header to rotate about the obstructing edge until the solid header slips past the obstructing edge.

9. The connector of claim 8 wherein:
the elongated body has a cylindrical shape.

10. The connector of claim 8 wherein:
the solid header comprises polished metal.

11. The connector of claim 8 wherein:
the elongated body comprises one of plastic, rubber, and braided metal wire.

12. The connector of claim 8 wherein:
the means for coupling comprises a pin.

13. The connector of claim 12 wherein:
the pin is pressed through the tube or cable behind the solid joiner.

14. The connector of claim 8 further comprising:
the joiner comprises a press-fit connector.

15. The connector of claim 14 wherein:
the press-fit connector is of integral construction with the elongated body.

16. The connector of claim 8 wherein:
the means for coupling is disposed behind the joiner.

17. The connector of claim 8 wherein:
the means for coupling is disposed within a length of the joiner.

18. A connector for coupling a pull string to a tube or cable, whereby the tube or cable can be pulled through a duct having an obstructing edge, the connector comprising:
a hard, rigid header including a curved front surface having a substantially axial hole there through which the tube or cable may be passed;
a cylindrical body having a first end and a second end, wherein the first end is coupled to the header;
means for coupling the cylindrical body to the tube or cable near the second end of the cylindrical body; and
means for coupling the pull string to one of (i) the tube or cable and (ii) the cylindrical body, near the second end of the cylindrical body;
wherein, when the connector is pulled through the duct by the pull string and encounters the obstructing edge, tension on the pull string is applied near the second end of the cylindrical body, causing the cylindrical body to deform under compression, in turn causing the header to rotate about the obstructing edge, whereby the connector slips past the obstructing edge.

* * * * *